April 30, 1940.   R. P. KOEHRING   2,198,702
METHOD OF MAKING MOLDED POROUS METAL ARTICLES
Filed June 1, 1937
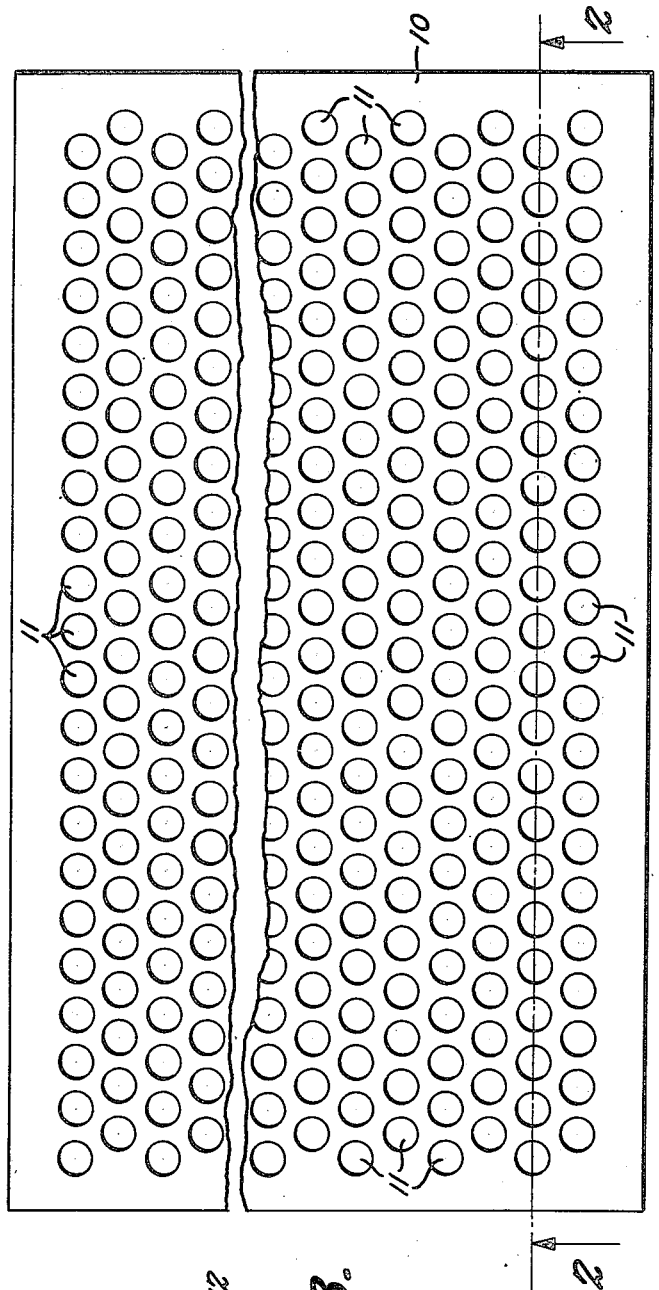
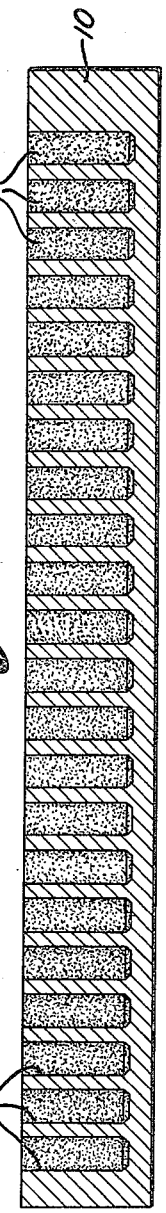
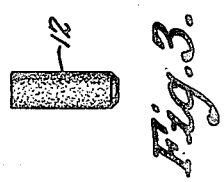
INVENTOR
Roland P. Koehring
BY
Spencer Hardman & Fehr
HIS ATTORNEYS Patented Apr. 30, 1940

2,198,702

UNITED STATES PATENT OFFICE 2,198,702

METHOD OF MAKING MOLDED POROUS METAL ARTICLES

Roland P. Koehring, Dayton, Ohio, assignor to General Motors Corporation, Detroit, Mich., a corporation of Delaware Application June 1, 1937, Serial No. 145,747

7 Claims. (Cl. 75—22)

This invention relates to improvements in the manufacture of sintered metal articles from powdered metal.

An object of this invention is to provide an improved method for making sintered metal parts molded to shape and having a very high porosity.

Heretofore sintered metal bushings and other parts have been molded to shape by first compacting or briquetting the metal powder into the desired molded form, after which the self-sustaining compacted form is removed from its mold and then sintered. The degree of porosity in the final article obtainable by such prior method is materially reduced by the initial compacting of the metal powder to form the self-sustaining briquette. A feature of this invention is the elimination of any high compacting of the metal powder whereby the degree of porosity of the final article may be greatly increased, nevertheless the article is given its desired shape and dimensions by a mold cavity. Hence the method of this invention makes full use of the many advantages of manufacture due to the use of a mold for forming the article, but avoids the disadvantage of limiting the degree of porosity of the article resulting from highly compacting the metal powder.

Hence an important feature of this method is the sintering of the metal powder while it is still within the forming mold cavity. This is permitted by using a hard graphite mold which can withstand the sintering heat and atmosphere and which will not bond nor stick to the sintered metal article.

Further objects and advantages of the present invention will be apparent from the following description, reference being had to the accompanying drawing wherein a preferred embodiment of the present invention is clearly shown.

In the drawing:

Fig. 1 is a plan view of a graphite mold for making at one time a large number of small porous metal oil-metering plugs, according to this invention.

Fig. 2 is a section on line 2—2 of Fig. 1, but shows the mold cavities filled with the loose metal powder to be sintered therein.

Fig. 3 is a side view of the finished sintered porous plug.

Similar reference characters refer to similar parts throughout the several views.

The mold 10 shown in the drawing is a hard graphite slab into which a large number of mold cavities 11 of desired size and shape have been drilled. The cylindrical porous metal oil-metering plug 12 with one chamfered end is the product from the mold shown in Figs. 1 and 2. The plug shown is one-quarter inch in diameter and .65 inch long. Obviously these dimensions may be varied at will simply by making the mold cavities 11 to give the desired size or shape. The cavities 11 are slightly larger than the finished article, as will be described hereinafter.

To fill the mold cavities 11, a quantity of the finely divided metal powder is poured onto the mold 10 and carefully flowed across the entire surface until all the holes 11 are uniformly filled flush with the top with the loose powder 13 as shown in Fig. 2. Any excess powder is scraped from the mold 10 by means of a straight edge or the like.

The mold 10 together with its contents is then put thru a controlled atmosphere sintering furnace, which causes the loose powder 13 to sinter together and form a highly porous rigid metal structure 12. Considerable shrinkage occurs during sintering both in the diameter and length of the final part 12, and this shrinkage is to be considered when determining the dimensions of the mold cavities 11. The degree of shrinkage can be varied by controlling several variables such as: (1) the temperature and time period of sintering, (2) the particular proportions and ingredients used in the powder 13 and the particle size thereof, (3) the powder 13 may be slightly packed into the cavities 11 to reduce the degree of shrinkage. When all these variables are known, the mold cavities are given such dimensions that the final molded and sintered article has the desired dimensions. During sintering the mold cavity maintains the loose powder in the shape of the article to be made until such time as the powder particles cohere or strongly bond together and thereupon become self-sustaining in the desired molded shape. As sintering progresses further the now self-sustaining form shrinks uniformly and hence becomes loose in the mold cavity, yet maintains the desired molded shape.

After the sintering step is completed, the mold 10 and contents are cooled down in a non-oxidizing atmosphere to prevent burning of the graphite mold 10 or the formation of metal oxides on the sintered parts 12. After cooling, the parts 12 rest loosely within the mold cavities 11 and may be removed simply by inverting the mold 10 and dumping them out.

A metal powder mixture of 90 parts Cu, ten parts tin, and two parts graphite sintered at a temperature of 1550° F. has given very satisfactory results for the oil-metering plug shown in Fig. 3. It is to be understood that when metal powder is referred to herein, that such a designation can include metal powder alone or metal powder and graphite in comminuted form. Plugs made in this way will pass oil of 75 viscosity and at 60 lbs. per square inch pressure at the rate of 50 to 100 c. c. per square inch per minute. In other words, these plugs are highly porous. It is impossible to get this high rate of oil flow from porous plugs made by conventional briquetting methods.

Also the method of this invention permits very rapid and economical manufacture of these plugs or other highly porous articles because of the elimination of the briquetting of the powder into the mold cavities. The mold cavities 11 can be uniformly filled at a very high rate and the powder in each cavity will be of uniform density from end to end thereof.

The method of this invention may also be used to great advantage to make quite large porous metal disks or washers, which by prior methods would require very large and expensive briquetting equipment due to the very large total force required to briquette the articles. Also this method avoids the difficulties of the older methods of handling the thin or fragile briquetted articles prior to sintering same.

A large flat bearing washer or disk may be made by this method in substantially the same way as described above for the porous plugs 12, except that its mold cavity in its graphite mold would be wide and of shallow depth and hence greater care would have to be exercised in filling the mold cavity to obtain uniform density throughout its wide area. The shrinkage during sintering is predetermined and taken care of by allowing the necessary greater dimensions of the mold cavity, as above described. The sintered washers are highly porous but if desired they may be sized down between suitable dies at high pressure to increase their density to the desired value. The metal powder ingredients to be used to form such large porous washers or disks may vary depending upon the use for which they are designed. For bearing washers any suitable and well known bronze or brass formulas may be used if desired. As a specific example, large porous bearing washers made from metal powder ingredients comprising 90 parts Cu, 9.5 parts Zn, .5 part Sn according to the method of this invention, gives very good results and physical properties. Some washers made to the above formula and tested in the laboratory gave the following:

Tensile strength_____lbs. per sq. in.___32,800
Shear _____do___28,500
Elongation_____per cent___12
Reduction of area_____do___14.6

While the embodiment of the present invention as herein disclosed, constitutes a preferred form, it is to be understood that other forms might be adopted, all coming within the scope of the claims which follow.

What is claimed is as follows:

1. The steps in the method of making a highly porous molded article through which fluids may readily pass, comprising: loosely filling a mold cavity of the desired shape with finely divided material consisting of metal powder including at least two metallic components of different melting points, then passing the filled mold thru a hot sintering chamber containing a controlled non-oxidizing atmosphere at a temperature above the melting point of the lowest melting metallic component and thereby sintering the metal powder into a rigid porous alloy structure and simultaneously causing said rigid structure to shrink sufficiently from the mold cavity walls as to be readily ejected therefrom after sintering is completed.

2. The steps in the method of making a highly porous molded article through which fluids may readily pass, comprising: loosely filling a mold cavity of the desired shape with finely divided material consisting of metal powder including at least two metallic components of different melting points, then heating the mold and its metal powder contents together in a sintering chamber in a non-oxidizing atmosphere at a temperature above the melting point of the lowest melting metallic component until the metal powder is sintered together to form a rigid highly porous alloy structure slightly smaller than the mold cavity but having a shape determined by that of the mold cavity, cooling the mold and its contents in a non-oxidizing atmosphere, then removing the sintered article therefrom.

3. The steps in the method of making a highly porous molded article through which fluids may readily pass, comprising: providing a hard graphite mold having a mold cavity having the desired shape of the final article, loosely filling said mold cavity with finely divided material consisting of metal powder including at least two metallic components of different melting points, then heating together the mold and its contents in a sintering chamber at a temperature above the melting point of the lowest melting metallic component, in such a reducing atmosphere as not to burn the graphite mold, until the metal powder is sintered together to form a rigid highly porous alloy structure of the same shape as but slightly smaller than the mold cavity, then removing the rigid sintered article from the mold cavity.

4. The steps in the method of making a highly porous metal article through which fluids may readily pass, comprising: providing a hard graphite mold having a mold cavity having the desired shape of the final article to be made, filling the mold cavity with uncompacted intimately mixed material consisting of metal powder including at least two metallic components of different melting points, then heating together the mold and its contents in a sintering chamber in a reducing atmosphere at a temperature above the melting point of the lowest melting metallic component and for such a time period as will cause the loose metal particles to sinter together and form a rigid porous alloy article and to simultaneously shrink slightly so that the final sintered article rests loosely within the mold cavity, then removing the rigid sintered article from the mold cavity.

5. The steps in the method of making a highly porous molded article through which fluids may readily pass comprising; loosely filling a mold cavity of the desired shape with a mixture consisting of finely divided metal powders including at least two metallic components of different melting points, and then heating the filled mold under non-oxidizing conditions at a temperature intermediate the melting points of the metallic components of the metal powder and thereby sintering the metal powders together into a strong highly porous structure and simultaneously causing the highly porous structure to shrink sufficiently from the mold cavity walls as to be readily ejected therefrom after sintering is completed.

6. The steps in the method of making a highly porous molded article through which fluids may readily pass comprising; loosely filling a mold cavity of the desired shape with a mixture consisting of finely divided metal powders including at least two metallic components of different melting points, heating the filled mold under non-oxidizing conditions at a temperature intermediate the melting points of the metallic components of the metal powder and thereby sintering the metal powders together into a strong highly porous structure and simultaneously causing the highly porous structure to shrink sufficiently from the mold cavity walls as to be readily ejected therefrom after sintering is completed, and then subsequently pressing the porous molded article in the cold condition for controlling the porosity thereof.

7. The steps in the method of making a highly porous bronze article through which fluids may readily pass comprising; loosely filling a mold cavity of the desired shape with a mixture consisting of finely divided copper and tin powders, heating the filled mold under non-oxidizing conditions to a temperature well above the melting point of tin and below the melting point of copper for a time sufficient to cause a porous bronze article to be formed and simultaneously cause the porous bronze article so formed to shrink sufficiently from the mold cavity walls as to be readily ejected therefrom after the heating step has been completed.

ROLAND P. KOEHRING.